(12) United States Patent
Fedusa et al.

(10) Patent No.: US 9,700,929 B2
(45) Date of Patent: Jul. 11, 2017

(54) METHOD FOR EXPANDING THE DIAMETER OF A METAL CONTAINER

(71) Applicant: ALCOA INC., Pittsburgh, PA (US)

(72) Inventors: Anthony J. Fedusa, Lower Burrell, PA (US); Gary L. Myers, Sarver, PA (US); Gary L. Hunker, North Apollo, PA (US); Robert E. Dick, Cheswick, PA (US)

(73) Assignee: Alcoa USA Corp., Pittsburgh, PA (US)

( * ) Notice: Subject to any disclaimer, the term of this patent is extended or adjusted under 35 U.S.C. 154(b) by 138 days.

(21) Appl. No.: 13/722,409

(22) Filed: Dec. 20, 2012

(65) Prior Publication Data

US 2013/0160517 A1 Jun. 27, 2013

Related U.S. Application Data

(60) Provisional application No. 61/579,196, filed on Dec. 22, 2011.

(51) Int. Cl.
*B21D 51/26* (2006.01)

(52) U.S. Cl.
CPC ..... *B21D 51/2615* (2013.01); *B21D 51/2623* (2013.01); *B21D 51/2646* (2013.01)

(58) Field of Classification Search
CPC . B65D 21/02; B65D 8/00; B65D 1/26; B21D 17/02; B21D 51/26; B21D 51/2646;
(Continued)

(56) References Cited

U.S. PATENT DOCUMENTS 4,102,168 A * 7/1978 Brookes ................ B21D 41/02
72/117
4,512,172 A * 4/1985 Abbott ............... B21D 51/2615
72/105

(Continued)

FOREIGN PATENT DOCUMENTS

AR 196947 * 2/1974
DE 3041001 5/1982
(Continued)

OTHER PUBLICATIONS

Document AR196947 complete with translation is attached as provided by applicant.*

(Continued)

*Primary Examiner* — Peter DungBa Vo
*Assistant Examiner* — John S Lowe
(74) *Attorney, Agent, or Firm* — Greenberg Traurig, LLP (57) ABSTRACT

A method of forming a metal container comprises: curling outward a top edge of the metal container to form a curl and expanding a diameter of a first section of the metal container to form a first expanded section; wherein at least part of the first expanded section is below the curl. In some embodiments, the steps of curling outward a top edge of the metal container to form a curl and expanding a diameter of a first section of the metal container to form a first expanded section are performed in a single stroke of a single die. In some embodiments, the step of expanding a diameter of a first section of the metal container to form an expanded section is performed after the step of curling outward a top edge of the metal container to form a curl.

20 Claims, 7 Drawing Sheets

(58) Field of Classification Search
CPC ............ B21D 51/2615; B21D 51/2638; B21D 22/025; B21D 39/20; B21D 22/26; B21D 41/02; B21D 51/2623; B21D 51/263; B21D 1/08; B21D 26/033; B21D 26/049; Y10S 72/715; Y10S 220/906
USPC ........... 413/76, 69; 72/338, 377, 372, 370.1, 72/370.24, 715, 352, 356, 347, 348, 72/379.4, 370.06, 355.4, 343; 29/507, 29/508, 509, 510, 511, 512
See application file for complete search history.

(56) References Cited

U.S. PATENT DOCUMENTS

| | | | | |
|---|---|---|---|---|
| 4,574,608 | A * | 3/1986 | Bulso, Jr. ............... | B21D 51/44 413/62 |
| 5,727,414 | A * | 3/1998 | Halasz et al. .................. | 72/348 |
| 6,038,910 | A * | 3/2000 | McClung ............... | B21D 22/26 72/348 |
| 6,250,122 | B1 * | 6/2001 | Robinson et al. ................ | 72/61 |
| 6,422,991 | B1 * | 7/2002 | Jaeger ............................. | 600/25 |
| 6,442,991 | B1 * | 9/2002 | Rojek .................... | B21D 51/26 72/352 |
| 7,934,410 | B2 * | 5/2011 | Myers .................. | B21D 22/025 413/69 |
| 2004/0011112 | A1 * | 1/2004 | Lentz et al. ................. | 72/370.1 |
| 2011/0277528 | A1 * | 11/2011 | Roeterdink .......... | B21D 22/025 72/352 |

FOREIGN PATENT DOCUMENTS

| | | | |
|---|---|---|---|
| DE | 3041001 | A * | 5/1982 |
| DE | 3041001 | A1 * | 5/1982 |
| JP | 03161129 | | 7/1991 |
| JP | 03161129 | A * | 7/1991 |

OTHER PUBLICATIONS

International Search Report and Written Opinion of the International Searching Authority relating to corresponding PCT application No. PCT/US2012/070979 dated Jun. 27, 2013.

* cited by examiner

METHOD FOR EXPANDING THE DIAMETER OF A METAL CONTAINER

CROSS-REFERENCE TO RELATED APPLICATIONS

This patent application claims priority to U.S. Provisional Patent Application No. 61/579,196, filed Dec. 22, 2011, which is incorporated herein by reference in its entirety.

BACKGROUND

In the container industry, substantially identically shaped metal beverage containers are produced massively and relatively economically. In order to expand a diameter of a container to create a shaped container or enlarge the diameter of the entire container, often several operations are required using several different expansion dies to expand each metal container a desired amount.

SUMMARY

A method of forming a metal container comprises: curling outward a top edge of the metal container to form a curl and expanding a diameter of a first section of the metal container to form a first expanded section; wherein at least part of the first expanded section is below the curl.

The metal container may be any type of metal container including beverage cans, bottles and cups, aerosol cans and food containers. The metal comprising the metal container may be any metal known in the art including aluminum, aluminum alloys and steel. The metal container can be made by any process known in the art including but not limited to: drawing and ironing; impact extrusion; spin forming; draw and redraw; and deep drawing.

In order to expand more efficiently, in some embodiments, contact between the expansion die and the top edge of the metal container is avoided in at least some of the expansion operations. One way to do this is to curl outward the top edge of the metal container prior to at least some of the expansion operations.

Curling is a bending operation that bends the edge of the metal container. Curling includes forming operations that create a curved rim on top of the metal container. For the purposes of this patent application, curling also includes flanging and flaring the edge of the metal container. Curling may add stiffness to the metal container. In some embodiments flanging creates a 90° bend in the metal container.

For the purposes of this patent application, a curl is a bend along the edge of the metal container.

In some embodiments, the steps of curling outward a top edge of the metal container to form a curl and expanding a first section of the metal container to form a first expanded section are performed simultaneously.

In some embodiments, the steps of curling outward a top edge of the metal container to form a curl and expanding a diameter of a first section of the metal container to form a first expanded section are performed in a single stroke of a single die.

In some embodiments, the step of expanding a diameter of a first section of the metal container to form an expanded section is performed after the step of curling outward a top edge of the metal container to form a curl.

Some embodiments further comprise expanding a diameter of a second section of the metal container to form a second expanded section after the first expanding step.

Some embodiments, further comprise a step of expanding a diameter of a third section of the metal container to form a third expanded section before the step of curling outward a top edge of the metal container to form a curl.

In some embodiments, expanding the first section of the metal container is accomplished using an expansion die. An expansion die is a die that when inserted into an opening of a container increases the diameter of the container via mechanical force. In some embodiments, the step of expanding a first section of the metal container to form an expanded section comprises inserting the expansion die into an open end of the metal container.

In some embodiments, the diameter of the first section of the metal container is expanded by at least 5%, 10%, 15%, 20%, 25%, 30%, 35%, 40%, 45% or 50% by a single land in a single stroke of a single expansion die.

In some embodiments, an original diameter of a metal container is expanded by at least a 5%, 10%, 15%, 20%, 25%, 30%, 35%, 40%, 45% or 50% by a single land in a single stroke of a single expansion die without first narrowing the metal container.

In some embodiments, the top edge of the metal container is curled by one of: a rotary curler and a die.

Some embodiments further comprise removing the curl from the top edge of the metal container. In some embodiments, the curl is removed from the top edge of the metal container by trimming the top edge of the metal container.

BRIEF DESCRIPTION OF THE DRAWINGS

FIG. 12b depicts a cross-sectional side view of the die of FIG. 12a;

FIG. 13b depicts a cross-sectional side view of the die of FIG. 13a;

FIG. 14a depicts a partial cross-sectional side view of an expansion and curling die used to form the metal container of FIG. 11; and FIG. 14b depicts a cross-sectional side view of the die of FIG. 14a.

DESCRIPTION

For the purposes of this specification, terms such as top, bottom, below, above, under, over, etc. are relative to the position of a finished metal container resting on its base on a flat surface, regardless of the orientation of the metal container during manufacturing or forming steps or processes. A finished metal container is a metal container that will not undergo additional forming steps before it is used by an end consumer. In some embodiments, the top of the container has an opening.

Referring to FIGS. 1-4, in one embodiment, a method of forming a metal container 100 comprises: curling outward a top edge 102 of the metal container 100 to form a curl 104; expanding a first section 106 of the metal container 100 to form an expanded section 108; wherein at least part of the expanded section 108 is below the curl 104; wherein the curling and expanding are accomplished in a single stroke of a single die.

Figure 1:
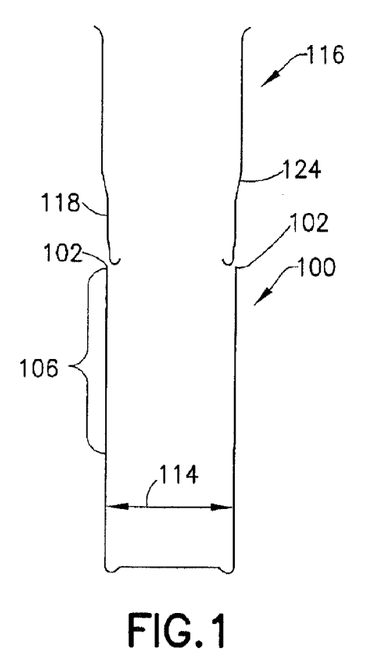
FIG. 1 depicts a cross-sectional side view of a pre-form metal container and a cross-sectional side view of an expansion die capable of expanding the diameter of the pre-form metal container and curling a top edge of the pre-form metal container.

FIG. 1 shows a cross-section of a metal container 100 before having undergone the step of curling outward a top edge 102 of the metal container 100 to form a curl 104. The original diameter 114 is the diameter of the metal container 100 after it has been formed via drawing and ironing or extrusion but before it has been shaped, i.e. what is commonly known in the art as a pre-form metal container. In some embodiments, there is no need to pre-stress the metal container 100 by narrowing or other means before it is expanded.

FIG. 1 also shows a cross-section of a first working surface 118 of a first expansion die 116 before contacting the metal container 100. The first working surface 118 has a first land 124. A land is the portion of the working surface of an expansion die having the largest outer diameter that contacts a section of a container. It is possible for a die to have multiple working surfaces, each having a different land, each land having a different outer diameter, wherein the land having the smallest outer diameter travels further into the container than the land(s) having a larger outer diameter. The first expansion die 116 of FIG. 1 is dimensioned to expand the diameter of the metal container 100 and also to form of curl 104 on the top edge 102 of the container 100.

Figure 2:
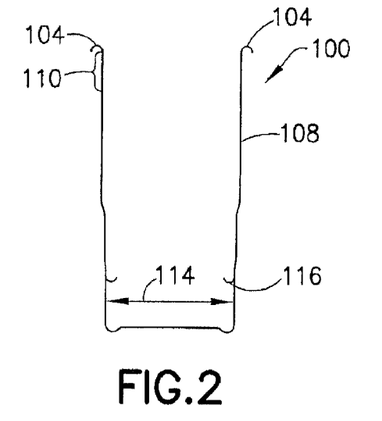
FIG. 2 depicts a cross-sectional side view of the pre-form metal container of FIG. 1 when the expansion die of FIG. 1 is at the bottom of its stroke inside the metal container.

FIG. 2 shows the cross-section of the metal container 100 as the top edge 102 is being curled and the first section of the metal container 100 is being expanded to form a first expanded section 108. The first expansion die 116 is shown at the bottom of its stroke inside the metal container 100.

Figure 3:
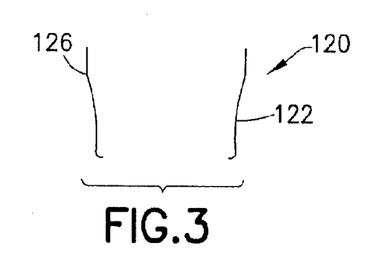
FIG. 3 depicts a cross-sectional side view of an expansion die.

FIG. 3 shows a second expansion die 120. The second expansion die 120 has a second working surface 122 and a second land 126.

Figure 4:
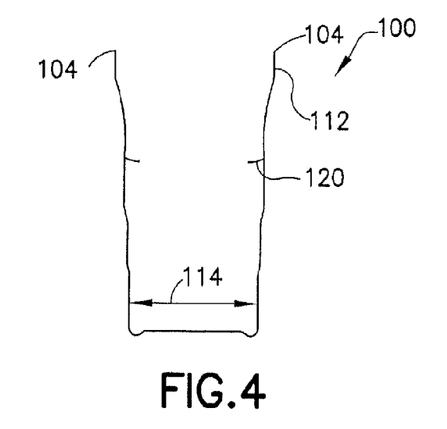
FIG. 4 depicts a cross-sectional side view of the expanded metal container of FIG. 2 when the expansion die of FIG. 3 is at the bottom of its stroke inside the metal container.

FIG. 4 shows the cross-section of the metal container 100 as a second section 110 (shown in FIG. 2) of the metal container 100 is being expanded to form a second expanded section 112. The second expansion die 120 is shown at the bottom of its stroke inside the metal container 100. In some embodiments, the stroke of the second expansion die 120 extends to the bottom of the metal container 100 or proximate to the bottom of the metal container 100.

Referring to FIGS. 5-10, in another embodiment, a method of forming a metal container 200 comprises: curling outward a top edge 202 of the metal container 200 to form a curl 204; expanding a first section 206 of the metal container 200 to form a first expanded section 208 after curling the top edge 202 of the metal container 200; wherein at least part of the first expanded section 208 is below the curl 204 and expanding a second section 210 of the metal container to form a second expanded section 212; wherein at least part of the second expanded section 212 is below the curl 204.

Figure 5:
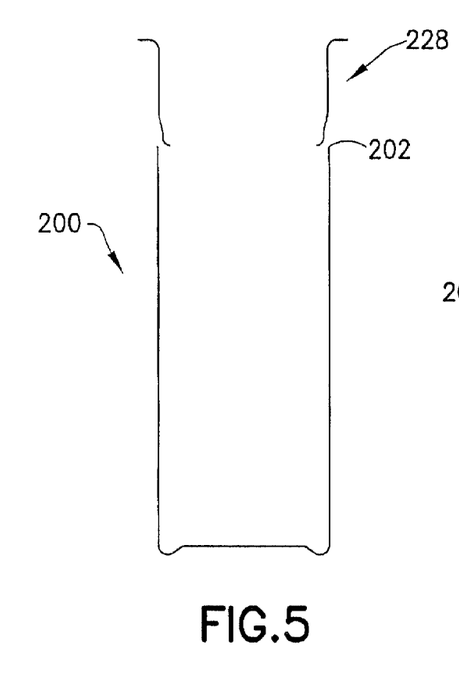
FIG. 5 depicts a cross-sectional side view of a pre-form metal container and a cross-sectional side view of an expansion die capable of expanding the diameter of the pre-form metal container.

FIG. 5 shows a cross-section of a metal container 200 before having undergone the step of curling outward a top edge 202 of the metal container 200 to form a curl 204. FIG. 5 also shows a cross-section of a curling die 228 before it enters the metal container 200. The curling die 228 is dimensioned to form the curl 204 on the top edge 202 of the container 200 as is well-known in the art.

Figure 6:
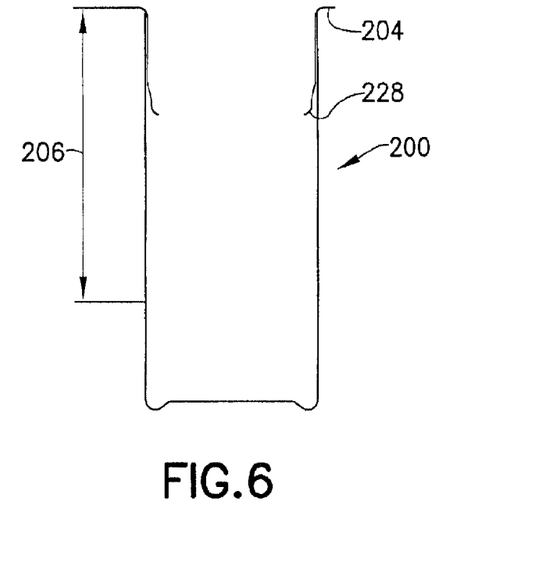
FIG. 6 depicts a cross-sectional side view of the metal container of FIG. 5 when the expansion die of FIG. 5 is at the bottom of its stroke inside the metal container.

FIG. 6 shows the cross-section of the metal container 200 as the top edge 202 is being curled by the curling die 228. The curling die 228 is shown at the bottom of its stroke inside the metal container 200.

Figure 7:
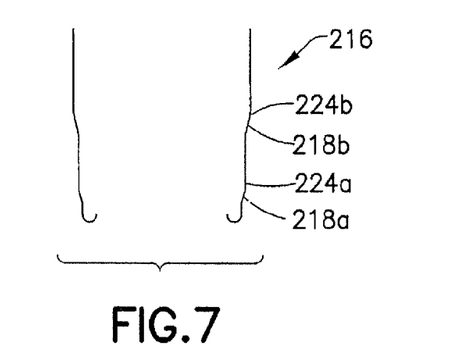
FIG. 7 depicts a cross-sectional side view of an expansion die.

FIG. 7 shows a first expansion die 216 before it enters the metal container 200. The first expansion die 216 has a first working surface 218a and a first land 224a and a second working surface 218b and a second land 224b each dimensioned to expand the diameter of the metal container 200.

Figure 8:
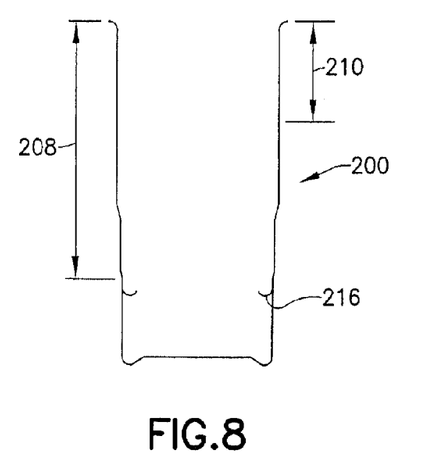
FIG. 8 depicts a cross-sectional side view of the expanded metal container of FIG. 6 when the expansion die of FIG. 7 is at the bottom of its stroke inside the metal container.

FIG. 8 shows the cross-section of the metal container 200 as a first section 206, shown in FIG. 6, of the metal container is being expanded to form a first expanded section 208. The first expansion die 216 is shown at the bottom of its stroke inside the metal container 200.

Figure 9:
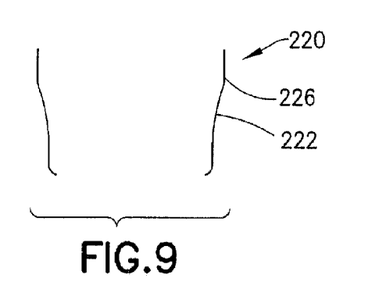
FIG. 9 depicts a cross-sectional side view of an expansion die.

FIG. 9 shows a second expansion die 220 before it enters the metal container 200. The second expansion die 220 has a third working surface 222 and a third land 226 dimensioned to expand the diameter of the metal container 200.

Figure 10:
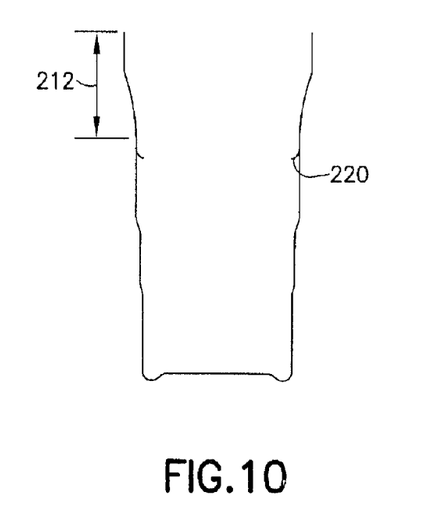
FIG. 10 depicts a cross-sectional side view of the expanded metal container of FIG. 8 when the expansion die of FIG. 9 is at the bottom of its stroke inside the metal container.

FIG. 10 shows the cross-section of the metal container 200 as a second section 210, shown in FIG. 9, of the metal container 200 is being expanded to form a third expanded section 212. The second expansion die 220 is shown at the bottom of its stroke inside the metal container 200.

In another embodiment of the invention, a metal container is expanded before a curl is formed, then expanded again after the curl has been formed. In yet another embodiment of the invention, a metal container is expanded after a curl has been formed. Then the curl is removed from the top of the container by trimming of the top edge of the container. The metal container may be necked after the curl is removed. Necking can be done by any means know in the arts such as described in U.S. Pat. Nos. 4,512,172; 4,563,887; 4,774,839; 5,355,710 and 7,726,165. In yet a further embodiment of the invention, a metal container is necked before a curl is formed and expanded after the curl has been formed.

In all of the embodiments above, the metal comprising the metal container may be any metal known in the art including, but not limited to, aluminum and steel. The metal container may or may not have a dome in the bottom or base of the metal container. In some embodiments, the metal container is a one-piece metal container having a closed bottom. In some embodiments, the metal container is comprised of multiple pieces of metal seamed together. In some embodiments, a sidewall of the metal container has a uniform thickness from top to near the bottom of the container.

In some embodiments, a sidewall of the metal container has a non-uniform thickness. In some embodiments, a sidewall of the metal container is tapered so that the thickness of the sidewall is thinner at the top of the container than the bottom of the container. In some embodiments, the thickness of a sidewall of the metal container varies along the height of the sidewall. In some embodiments, the sidewall is thicker at the top of the container than at a lower sidewall portion of the container.

Curling outward the top edge of the metal container to form a curl may be accomplished by any means known in the art such as die curling and rotary curling. As shown in FIGS. 1 and 2 the step of curling outward a top edge of the metal container may be accomplished by inserting a curling die into the metal container at least until the top edge of the container curls outwardly.

In some embodiments, the presence of a curl prevents the formation of lüder lines during subsequent expansion steps allowing for increased expansion in a single expansion step without damage to the metal container. In some embodiments, the presence of a curl also reduces axial shortening of the metal container during expansion. The radius of curvature of the curl and the angle of sweep of the curl affect the degree of expansion possible without damaging the metal container in the subsequent expansion step(s). In some embodiments, generally, the greater the radius of curvature of the curl, the greater degree of expansion possible in the subsequent expansion step without damaging the metal container. In some embodiments the angle of sweep of the curl is at least 90 degrees. In some embodiments the angle of sweep of the curl is at least 180 degrees. In some embodiments the angle of sweep of the curl is at least 270 degrees. Increasing the radius and/or arc length of the curl generally allows increased expansion in a single expansion step without damaging the metal container. In some embodiments, curls having an angle of sweep less than 90 degrees straighten to some extent during subsequent expansion, so that the angle of sweep is less after expansion. In some embodiments, curls having an angle of sweep greater than 180 degrees tighten during subsequent expansion.

Expanding the metal container can be done by any means known in the art, including, but not limited to inserting the working surface of an expansion die into an open end of the metal container. Expanding using an expansion die can be performed any way known in the art, including as described in U.S. Pat. Nos. 7,934,410 and 7,954,354. As shown in FIGS. 1 and 2 a single die can be used to both curl outward the top edge of the container and expand a diameter of the metal container.

In some embodiments, after forming a curl, a 21 percent expansion in diameter of a portion of the metal container by a single land in a single stroke of a single expansion die is possible. In other embodiments, after forming a curl, an expansion of diameter of a portion of the metal container of about 5%, 10%, 15%, 20%, 25%, 30%, 35%, 40%, 45% or 50% in a single expansion step by a single land in a single stroke of a single expansion die is possible. Some embodiments can expand the diameter of a metal container in one expansion step an amount that would require multiple expansion steps in the prior art.

In some embodiments, the land of the expansion die(s) have an undercut portion as shown in FIG. 5 and as described in U.S. Pat. Nos. 7,934,410 and 7,954,354. In other embodiments, no undercut portion is necessary. The presence of the undercut in the land of the expansion die enables more aggressive expansions of the metal container, including the ability to take deeper/longer strokes with the expansion die.

In some embodiments, the land has a surface roughness average (Ra) ranging from more than or equal to 8 μin to less than or equal to 32 μin, so long as the surface of the land does not disadvantageously disrupt the aesthetic and/or functional features of an inside coating on the metal container in a significantly observable manner, as described in U.S. Pat. Nos. 7,934,410 and 7,954,354.

In some embodiments, a knockout does not need to be used when expanding the metal container. A knockout provides a surface for releasing a metal container from an expansion die. In some embodiments, a pilot is used to control a top edge of a metal container. A pilot is a centering tool that controls movement of the top edge. In some embodiments, after curling the top edge of the metal container, the original diameter of a portion of the metal container is expanded by at least 5%, 10%, 15%, 20%, 25%, 30%, 35%, 40%, 45% or 50% by a single land in a single stroke of a single expansion die without a knockout and/or without first narrowing the metal container.

Embodiments of the invention are also applicable to other types and sizes of metal containers. For example, some embodiments may be used to form metal beverage, aerosol and/or food containers.

Figure 11:
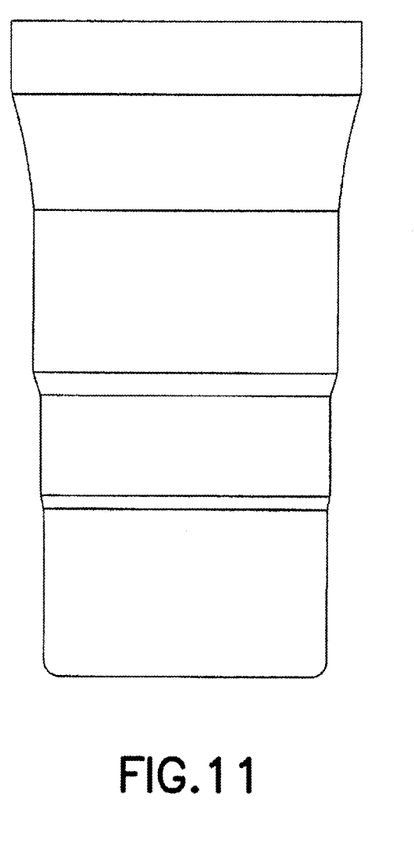
FIG. 11 depicts a side view of a metal container made according to one embodiment of the invention.
Figure 12A:
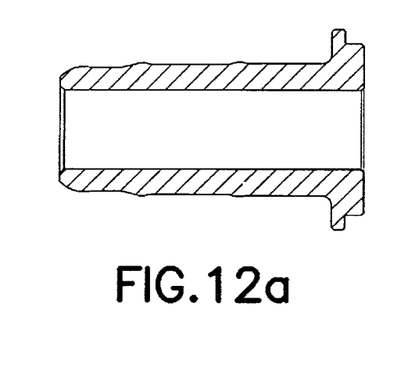
FIG. 12a depicts a partial cross-sectional side view of an expansion and curling die used to form the metal container of FIG. 11.
Figure 12B:
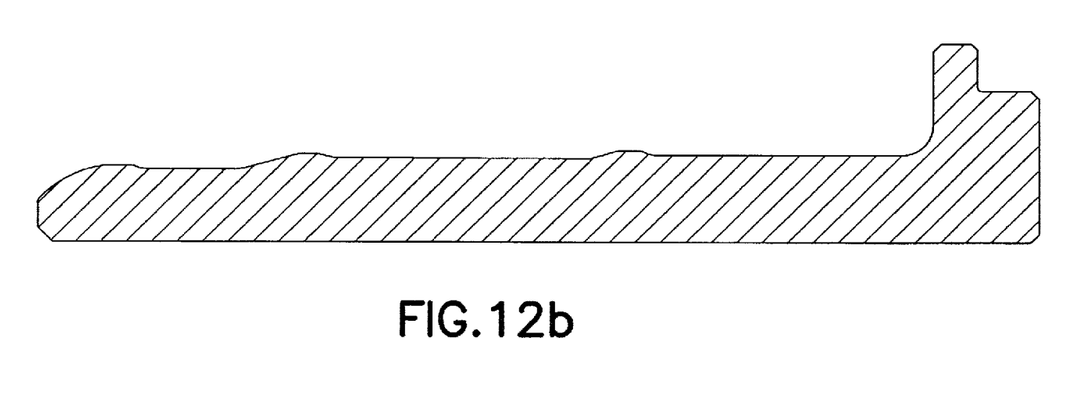

In one example, an embodiment of the invention, as described with respect to FIGS. 1-4, was used to make the metal container shown in FIG. 11 using the dies shown in FIGS. 12a, 12b, 13a, 13b, 14a and 14b. The die shown in FIGS. 12a and 12b was the first die inserted into an aluminum pre-form container. As can be seen in FIGS. 12a and 12b, the die has three lands. The die in FIGS. 12a and 12b was inserted into the aluminum pre-form container until the top edge of the container contacted the shoulder shown in FIG. 12b and a curl was formed. When the die shown in FIGS. 12a and 12b was inserted into the aluminum pre-form container, the internal air pressure of the container was 35 psi.

Figure 13A:
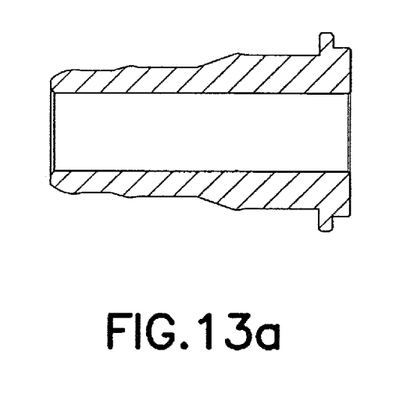
FIG. 13a depicts a partial cross-sectional side view of an expansion die used to form the metal container of FIG. 11.
Figure 13B:
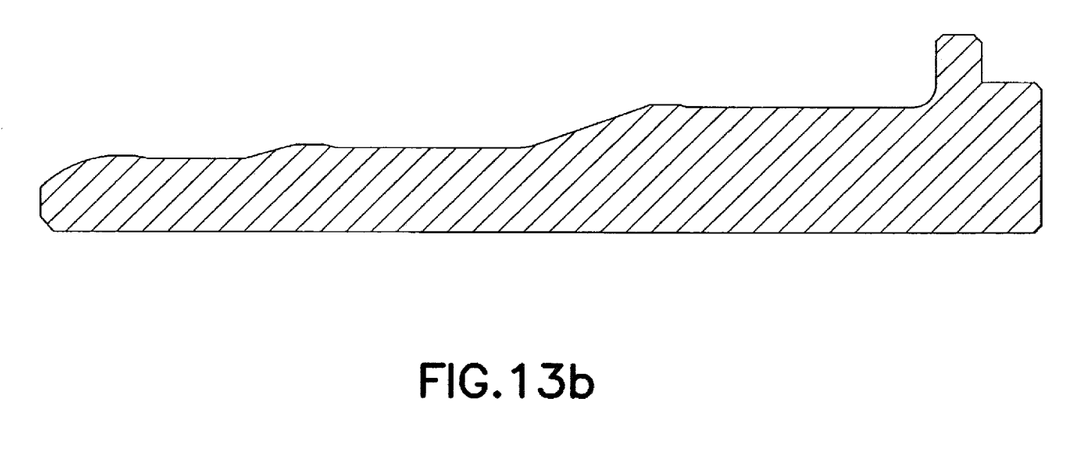

Next the die shown in FIGS. 13a and 13b was inserted into the expanded and curled container. The die shown in FIGS. 13a and 13b also has three lands. When the die shown in FIGS. 13a and 13b was inserted into the expanded and curled container, the internal air pressure of the container was 35 psi.

Figures 14A, 14B:
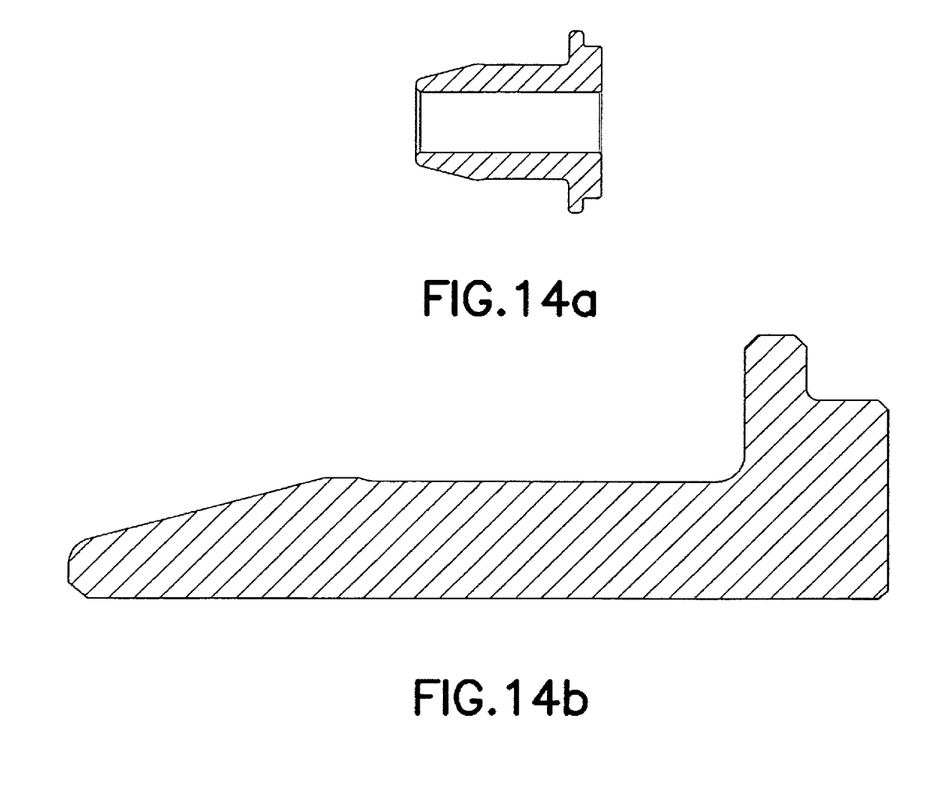

Finally, the die shown in FIGS. 14a and 14b was inserted into the curled and expanded container, resulting in the container shown in FIG. 11. The die shown in FIGS. 14a and 14b only has one land. When the die shown in FIGS. 14a and 14b was inserted into the expanded and curled container, the internal air pressure of the container was 60 psi.

Although the present invention has been described in considerable detail with reference to certain versions thereof, other versions are possible. Therefore, the spirit and scope of the appended claims should not be limited to the description of the versions contained herein.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means or step for" clause as specified in 35 U.S.C. §112.

The invention claimed is:

1. A method of forming a metal container comprising:
   providing a one-piece metal container with a top edge defining an opening and a closed bottom;
   curling outward the top edge of the metal container to form a curl;
   after curling, inserting an expansion die into the opening of the metal container, thereby expanding an original diameter of a first section to and thereafter expanding the expansion die thereby forming a first expanded section of the metal container onto the metal container; and
   wherein the original diameter of the metal container is expanded by at least 5% in a single stroke of a single expansion die without prior narrowing of the metal container;
   wherein at least part of the first expanded section is below the curl.

2. The method of claim 1 further comprising expanding a diameter of a second section of the metal container to form a second expanded section.

3. The method of claim 1 further comprising expanding a diameter of a second section of the metal container to form a second expanded section prior to curling step.

4. The method of claim 1 wherein the original diameter of the first section of the metal container is expanded by at least 5% in a single stroke of a single expansion die.

5. The method of claim 1 wherein the top edge of the metal container is curled by one of a rotary curler and a die.

6. The method of claim 1 further comprising removing the curl from the top edge of the metal container.

7. The method of claim 6 wherein the curl is removed from the top edge of the metal container by trimming the top edge of the metal container.

8. A method of forming a metal container comprising:
   (A) providing a one-piece metal container with a top edge defining an opening and a closed bottom, curling outward a top edge of the metal container thereby expanding an original diameter of a first section to form a first expanded section of the metal container;
   (B) inserting an expansion die into the opening of the metal container to form, by expanding the expansion die, a first expanded section; wherein at least part of the first expanded section is below the curl and wherein the curling step (A) and the expanding step (B) are performed simultaneously; and
   (C) removing the curl from the top edge of the metal container.

9. The method of claim 8 wherein the curling step (A) and the expanding step (B) are performed in a single stroke of a single die.

10. The method of claim 8 further comprising: (B1) after the curling step (A) and the expanding step (B) and prior to (C), expanding a diameter of the first expanded section of the metal container a second time, using another expansion die wherein the expanding steps (B) and (B1) are comprised of inserting an expansion die into the opening of the metal container.

11. The method of claim 8 wherein the diameter of the first section of the metal container is expanded by at least 5% in a single stroke of a single expansion die.

12. The method of claim 8 wherein an original diameter of the metal container is expanded by at least 5% in a single stroke of a single expansion die without prior narrowing of the metal container.

13. The method of claim 8 wherein the top edge of the metal container is curled by one of a rotary curler and a die.

14. The method of claim 8 wherein the curl is removed from the top edge of the metal container by trimming the top edge of the metal container.

15. A method of forming a metal container comprising:
   providing a one-piece metal container with a top edge defining an opening and a closed bottom;
   curling outward a top edge of the metal container to form a curl; and
   after curling, inserting an expansion die having a land into the opening of the metal container to form by expanding, a single land in a single stroke of the expansion die, without first narrowing the metal container to form a first expanded section;
   wherein at least part of the first expanded section is below the curl.

16. The method of claim 15 further comprising expanding a diameter of a second section of the metal container to form a second expanded section.

17. The method of claim 15 further comprising expanding a diameter of a second section of the metal container to form a second expanded section prior to the curling step.

18. The method of claim 15 wherein the top edge of the metal container is curled by one of a rotary curler and a die.

19. The method of claim 15 further comprising removing the curl from the top edge of the metal container.

20. The method of claim 15 wherein the curl is removed from the top edge of the metal container by trimming the top edge of the metal container.

* * * * *